United States Patent
Maggiore et al.

(10) Patent No.: US 11,979,685 B2
(45) Date of Patent: *May 7, 2024

(54) SYSTEM AND METHOD FOR REMOTE OBSERVATION IN A NON-NETWORKED PRODUCTION FACILITY

(71) Applicant: Apprentice FS, Inc., Jersey City, NJ (US)

(72) Inventors: Frank Maggiore, Jersey City, NJ (US); Angelo Stracquatanio, Jersey City, NJ (US); Ali Jaafar, Jersey City, NJ (US); John Zimmerman, Jersey City, NJ (US)

(73) Assignee: Apprentice FS, Inc., Jersey City, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/970,955

(22) Filed: Oct. 21, 2022

(65) Prior Publication Data

US 2023/0042370 A1    Feb. 9, 2023

Related U.S. Application Data

(63) Continuation of application No. 17/378,296, filed on Jul. 16, 2021, now Pat. No. 11,516,438.

(Continued)

(51) Int. Cl.
*H04N 7/18* (2006.01)
*G06F 21/31* (2013.01)
(Continued)

(52) U.S. Cl.
CPC ............ *H04N 7/181* (2013.01); *G06F 21/31* (2013.01); *G06F 21/84* (2013.01); *G06T 7/73* (2017.01);
(Continued)

(58) Field of Classification Search
CPC ........ H04N 7/181; H04N 5/04; H04N 5/2624; G06T 7/73; G06T 2207/10016; G06T 2207/10028; G06T 2207/20132; H04W 76/30; G06V 20/40; G06F 21/31; G06F 21/84

(Continued)

(56) References Cited

U.S. PATENT DOCUMENTS 8,620,468 B2 * 12/2013 Moyne ................... G16Z 99/00
                                                      700/121
10,108,162 B2 * 10/2018 Mizutani ............ G05B 19/0421

* cited by examiner

*Primary Examiner* — Trang U Tran
(74) *Attorney, Agent, or Firm* — Run8 Patent Group, LLC; Alexander Rodriguez

(57) ABSTRACT

A method includes: via a user interface of a hub device, receiving a first set of user credentials associated with a first operator, the hub device connected to a set of mobile devices; accessing a first operator schedule defining a first scheduled manufacturing operation and a first observer of the first scheduled manufacturing operation, the first observer characterized by a first set of observer credentials; detecting disconnection of a first mobile device in the set of mobile devices from the hub device, the first mobile device associated with a first device ID; in response to detecting disconnection of the first mobile device from the hub device, associating the first device ID with the first operator; and routing a first video feed from the first mobile device to the first observer based on the first device ID and the first set of observer credentials.

20 Claims, 10 Drawing Sheets

Related U.S. Application Data

(60) Provisional application No. 63/052,913, filed on Jul. 16, 2020.

(51) Int. Cl.
*G06F 21/84* (2013.01)
*G06T 7/73* (2017.01)
*G06V 20/40* (2022.01)
*G08B 5/22* (2006.01)
*H04N 5/04* (2006.01)
*H04N 5/262* (2006.01)
*H04W 76/30* (2018.01)

(52) U.S. Cl.
CPC .............. *G06V 20/40* (2022.01); *G08B 5/22* (2013.01); *H04N 5/04* (2013.01); *H04N 5/2624* (2013.01); *H04W 76/30* (2018.02); *G06T 2207/10016* (2013.01); *G06T 2207/10028* (2013.01); *G06T 2207/20132* (2013.01)

(58) Field of Classification Search
USPC ......................................................... 348/159
See application file for complete search history.

SYSTEM AND METHOD FOR REMOTE OBSERVATION IN A NON-NETWORKED PRODUCTION FACILITY

CROSS-REFERENCE TO RELATED APPLICATIONS

This application is continuation of U.S. Non-Provisional application Ser. No. 17/378,296, filed on 16 Jul. 2021, which claims the benefit of U.S. Provisional Application No. 63/052,913, filed on 16 Jul. 2020, each which is incorporated in its entirety by this reference.

This application is related to U.S. patent Application Ser. No. 16/700,851, filed on 2 Dec. 2019, which is incorporated in its entirety by this reference.

TECHNICAL FIELD

This invention relates generally to the field of process observation for regulated industries and more specifically to a new and useful system and method for remote observation of a non-networked production facility in the field of process observation for regulated industries.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
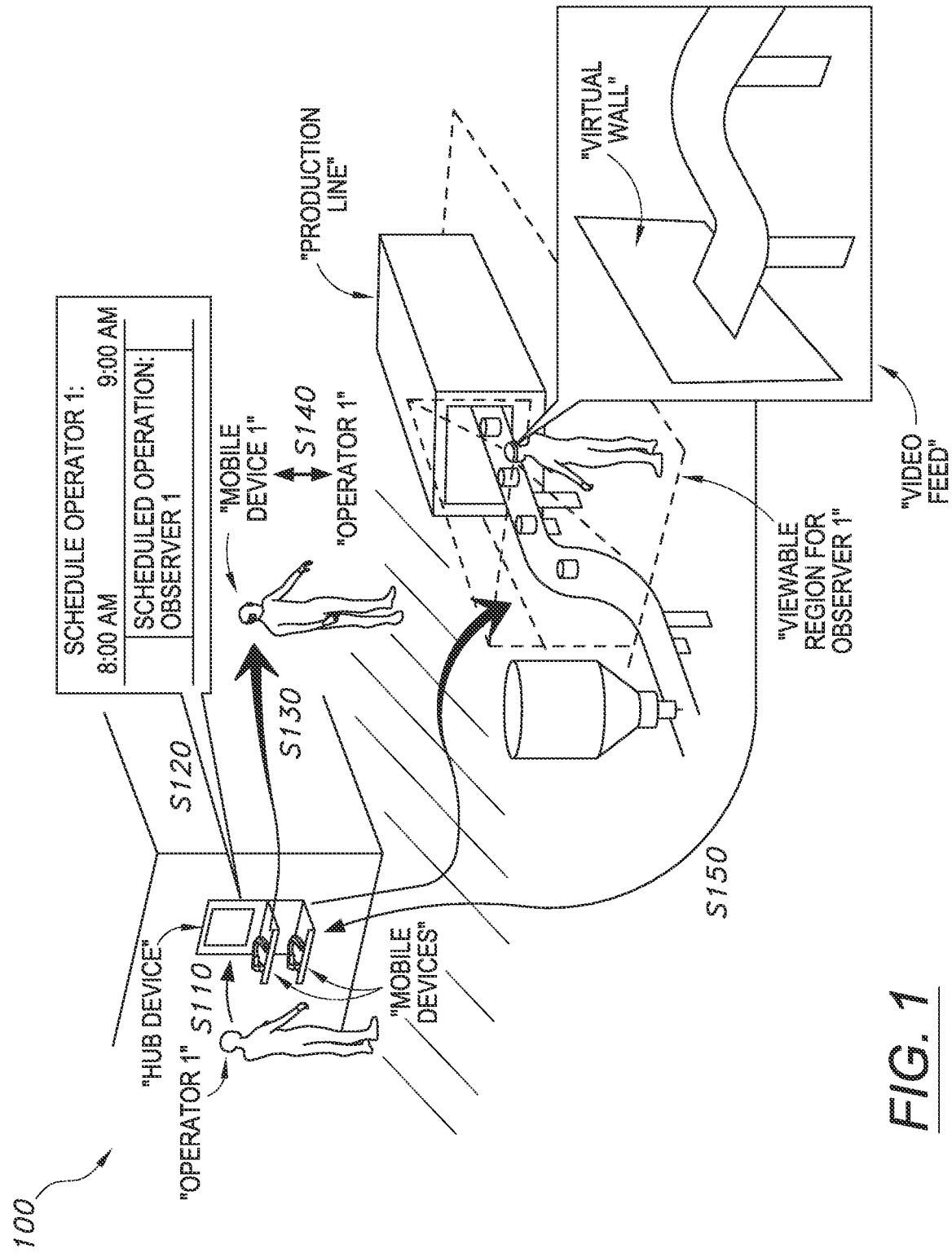
FIG. 1 is a flowchart representation of a method.

As shown in FIG. 1, a method S100 for remotely observing a manufacturing operation on a production facility including: via a user interface of a hub device, receiving a first set of user credentials associated with a first operator, the hub device connected to a set of mobile devices in Block S110; accessing a first operator schedule defining a first scheduled manufacturing operation and a first observer of the first scheduled manufacturing operation, the first observer characterized by a first set of observer credentials in Block S120; detecting disconnection of a first mobile device in the set of mobile devices from the hub device, the first mobile device associated with a first device ID in Block S130; in response to detecting disconnection of the first mobile device from the hub device, associating the first device ID with the first operator in Block S140; and routing a first video feed from the first mobile device to the first observer based on the first device ID and the first set of observer credentials in Block S150.

Figure 2:
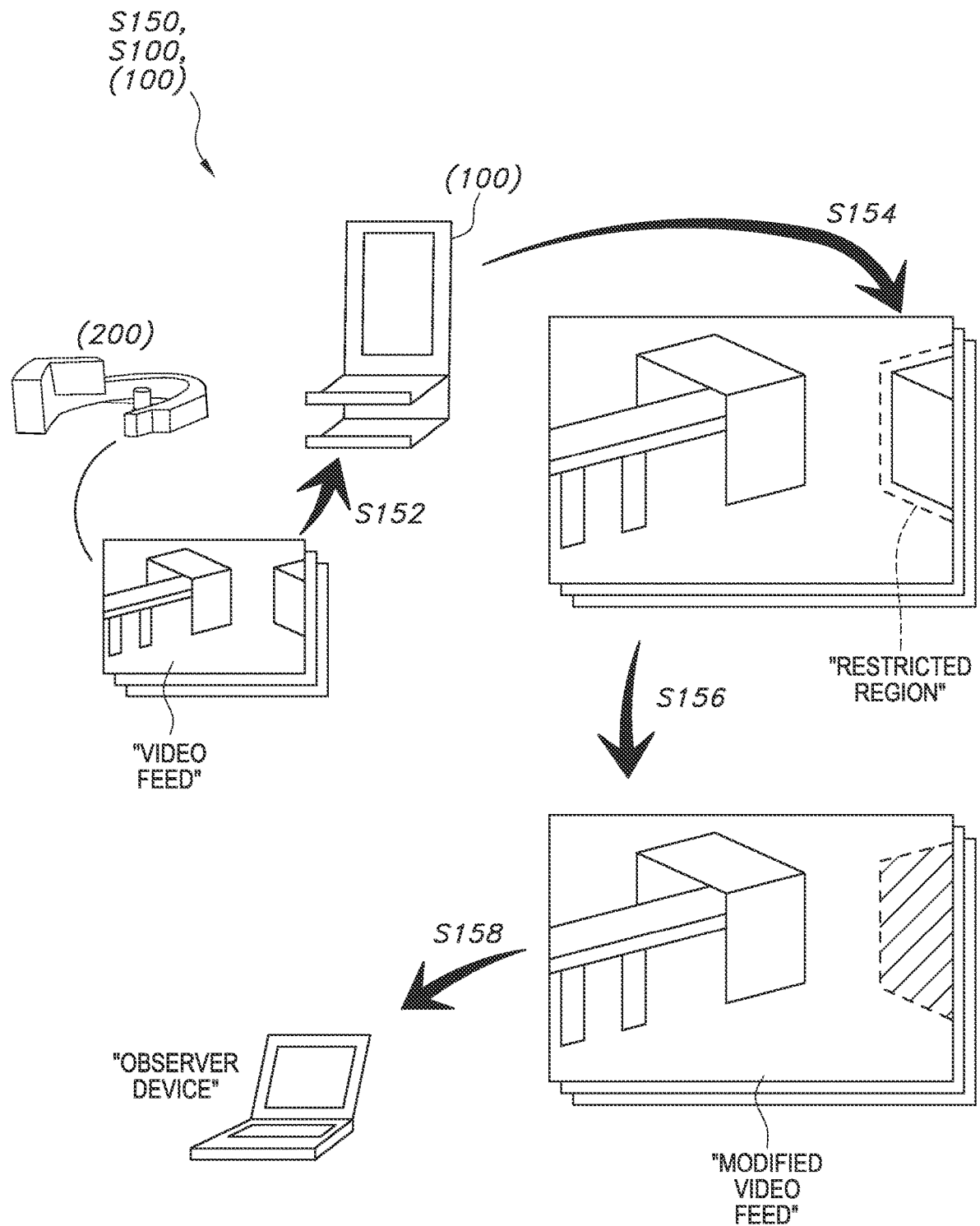
FIG. 2 is a flowchart representation of one variation of the method.

As shown in FIG. 2, the method S100 can also include: receiving the first video feed from the first mobile device in Block S152; identifying a first set of restricted regions depicted in the first video feed in Block S154; obscuring the first set of restricted regions in the first video feed to generate a first modified video feed in Block S156; and transmitting the first video feed to the first observer in Block S158.

2. Applications

Generally, a system includes a hub device, installed near an entrance of a production facility (e.g., a good manufacturing practice, hereinafter GMP, facility such as a pharmaceutical production facility or a biotechnical production facility), which operates as a base station for a set of mobile devices (e.g., augmented reality headsets, smartphones, tablet computers) in order to store and/or charge these mobile devices while not deployed within the production facility. The system executes Blocks of the method S100 to: automatically assign a particular mobile device to an operator upon deployment of the particular mobile device by the operator; detect scheduled tasks for the operator within the production facility; and coordinate a tethering session between the operator and a remote observer by routing a video feed from the particular mobile device to a remote observer. The system can also execute Blocks of the method S100 to: access observer credentials of the remote observer prior to routing the video feed; and, while routing the video feed to the remote observer, obscure areas of the video feed depicting regions of the production facility that are confidential based on these observer credentials.

Accordingly, the hub device can orchestrate the views that the remote observer is able to observe in live video feeds of the remote session such that the remote observer can observe only processes for which he or she is credentialed. Thus, the system facilitates secure, remote review and guidance of operators performing tasks within a GMP production facility—such as a contract manufacturing organization (hereinafter, "CMO")—by production supervisors, clients of the production facility, or regulators of the production facility, thereby reducing the number of people that must be present within the production facility for tandem operation of production lines within the production facility or review of manufacturing practices within the production facility.

For example, according to manufacturing in a GMP process, an operator may work in tandem with a supervisor or quality assurance personnel, who may observe and subsequently validate each step of a task performed by the operator. However, this practice may require both the operator and the observer to be present within the production facility at the same time. In this example application, the system can initiate a tethering session to connect a remote observer to a point-of-view (hereinafter, "POV") video feed from a mobile device of the operator to enable the observer to serve as a second-person verifier to observe the task performed by the operator as part of the GMP process within the production facility. The observer may then update batch records, SOPs, or procedures to indicate that the task was performed and completed correctly. Additionally or alternatively, the system can route, to the remote observer, the live video feed and/or recordings of the task event from multiple camera views within the region in which the operator is working and/or any linked sensor data to the process to assist in the verification process. Furthermore, by detecting deployment of mobile devices and automatically assigning mobile devices to operators via the hub device, the system can reduce the setup time of these tethering sessions and ensure that the video feed of the correct mobile device (i.e., the mobile device corresponding to a target operator) and/or the video feeds of other cameras viewing the task being performed by the target operator are routed to the observer.

In one example application, the system can schedule tasks within the facility. For example, the system can assign batch records, procedures, operations, and tasks to specific operators within the facility and, in response to the operator logging on to a mobile device, send these batch records, procedures, operations, and tasks to the mobile device. The system can also configure the mobile devices to alert an operator to execute a critical path of manufacturing operations based on the concurrent batch records, procedures, and/or steps. Additionally, the system can assign manufacturing operations to an operator in the facility in possession of a mobile device by: monitoring and tracking the location of the mobile device to detect whether the operator is in close physical proximity (e.g., within a threshold distance) to a manufacturing operation in the critical path and, in response to detecting that the mobile device is in close physical proximity to a manufacturing operation in the critical path, the system can assigns that task to the mobile device to complete. Additionally, the system can assign equipment (e.g., to reserve for specific operations), raw materials, consumables, or other materials to operators for use in tasks assigned to these operators. The system can display a linked inventory system at the hub device and can add materials into this inventory by scanning these materials via an image sensor or camera of the hub device or via the mobile device. The operator may request or order these materials from the inventory and assign these materials to scheduled tasks for the operator.

In another example application, the system can initiate a tethering session with a representative of a client of the production facility (e.g., a client of a CMO) to enable the client to review the manufacturing practices for a production line without being physically present at the production facility. However, routing a POV video feed from the mobile device of the operator may unintentionally expose confidential information, to which the client does not have access (e.g., visual feeds of adjacent production lines, monitors displaying confidential data). Therefore, the system can: identify a viewable region based on the credentials of the observer; detect the location and orientation of the mobile device of an operator; and augment the POV video feed from the mobile device to obscure areas of the production facility outside of a viewable region assigned to the observer. By obscuring certain areas or regions of the facility deemed confidential the system can partially and selectively block, within standard video feeds, 360-degree camera video feeds, thermal camera video feeds, a haptic display, depth scanning video feeds, virtual reality video feeds, mixed reality video feeds, augmented reality video feeds, holographic display feeds, or any other sensor or feed accessible and/or viewable to the observer. Thus, the system can route a video feed that enables clients to review the manufacturing practices pertaining to their products without exposing sensitive data from other (adjacent) production lines within the production facility.

The system, via the hub device installed locally within the production facility, can also integrate video feeds from multiple mobile devices, and/or from a set of stationary devices, in order to provide a remote observer with a more wholistic view of the production facility. For example, the system can generate a multi-feed video call including video feeds from a set of stationary devices (e.g., digital closed-circuit cameras), connected to the hub device via a local wireless network, and a set of mobile devices, and route this multi-feed video call to the remote observer such that the remote observer can view multiple locations along a production line simultaneously. The system can include and/or exclude video feeds from the multi-feed video call based on the credentials of the remote observer in order to exclude video feeds that may depict confidential information or to obscure regions of these video feeds to prevent the remote observer from viewing confidential regions of the production facility.

In addition to enabling tethering sessions between operators at the production facility and remote observers of the production facility, the system can also detect the identity and status of operators at the production facility in order to direct new training content to an operator or detect an emergency event affecting an operator within the production facility. For example, upon detecting the identity of an operator at the hub device, the system can serve training content to the operator via a display of the hub device prior to enabling the operator to check out a mobile device from the hub device, thereby keeping the operator advised of updates to manufacturing or safety procedures. In another example, the hub device can track the location of the operator based on data from the mobile device and/or the set of stationary devices located throughout the facility and identify a status of the operator based on her movement through the facility and/or in performing a task. The system can then detect an extended period of inactivity or a dangerous event such as a fall, mechanical malfunction, or fire at the production line and, in response to detecting any of these events, trigger an alarm and/or direct emergency services to the location of the injured or endangered operator.

3. System

Generally, the system can include a hub device, which functions as a base station for a set of mobile devices and can communicate with a set of stationary devices (e.g., digital closed-circuit imaging devices, LIDAR devices, passive infrared devices, wireless localization beacons) arranged within a production facility. The hub device can communicate with the set of mobile devices and/or the set of stationary devices via a shortrange wireless protocol such as WIFI, ZIGBEE, BLUETOOTH, and/or BLE.

Alternatively, the system can maintain an airgap between the set of mobile devices and the hub device during operation of the mobile devices in order to reduce the number of attack surfaces for the production facility and prevent interception of video feeds captured by the set of mobile devices by a third party. In this variation, the system may lack wireless network infrastructure either for security purposes or because the wireless network has not been extended to that area of the facility. In this alternative implementation, the system can upload and transmit a video feed captured and/or recorded to the local memory drive of a mobile device upon detecting a direct connection (e.g., a wired or short-range wireless connection) with the mobile device after completion of a scheduled manufacturing operation.

3.1 Hub Device

Figure 3:
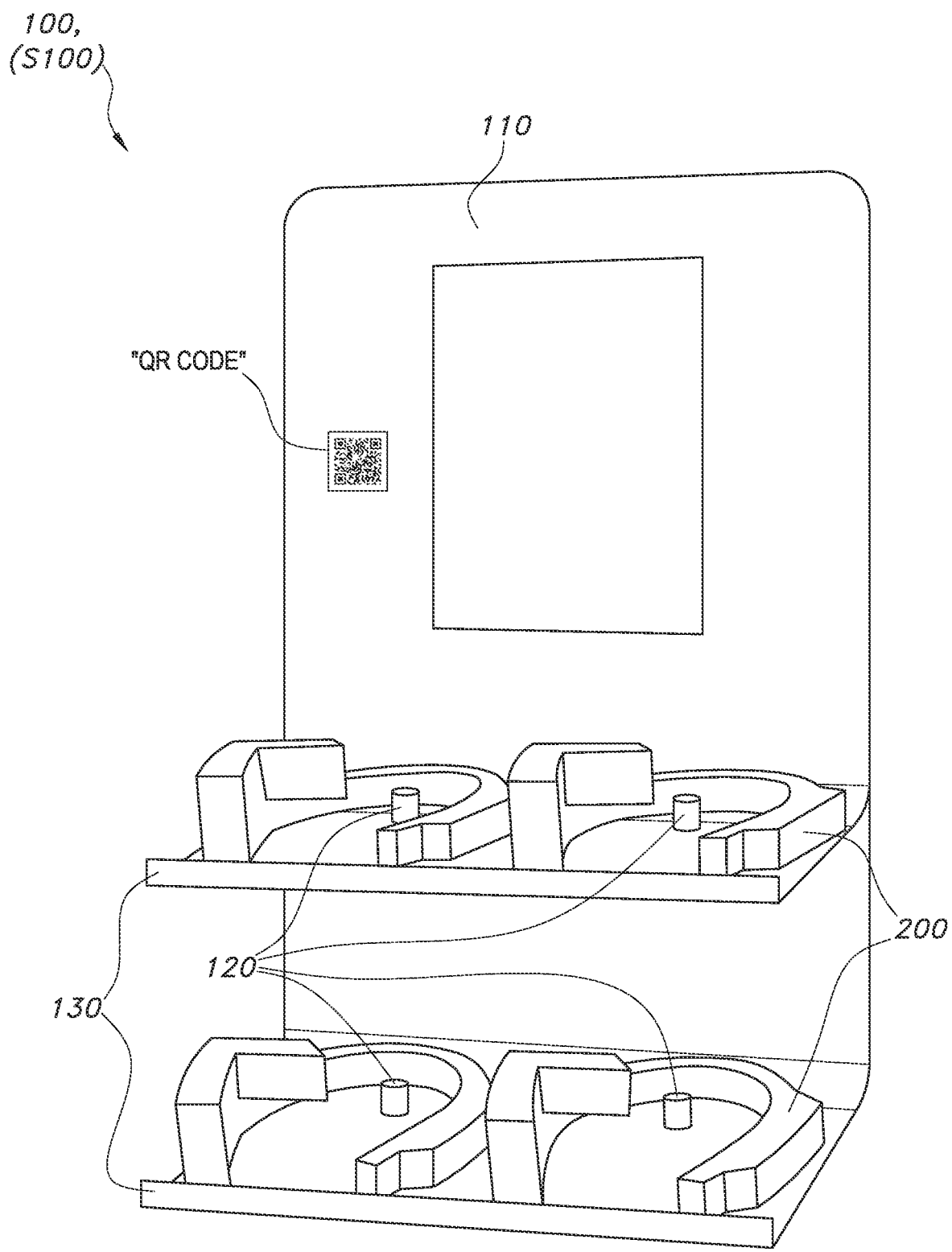
FIG. 3 is a schematic representation of a system.
Figure 4:
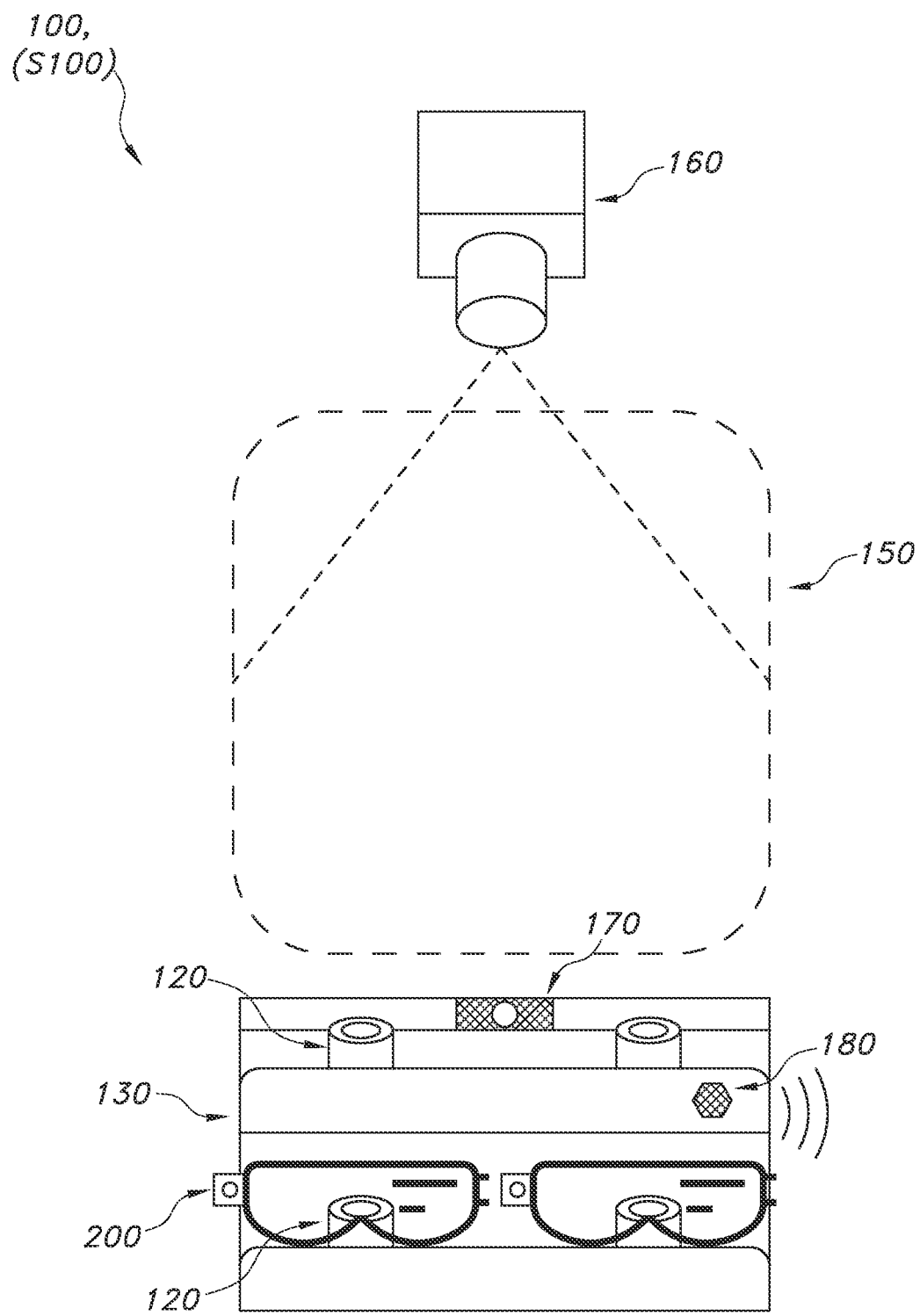
FIG. 4 is a schematic representation of one variation of the system.

As shown in FIGS. 3 and 4, the hub device is a network-connected (i.e., local-area-network-connected, internet-connected, cellular internet connected, satellite internet connected, radio-connected, line-of-sight connected, or other multiple-input multiple-output network) charging station and router for the set of mobile devices and the set of stationary devices deployed in the production facility while also including a user interface with which users can login, logout, initiate tethering sessions, and/or receive prompts, updates, or training content pertaining to operation of the production facility. More specifically, the hub device can include a chassis housing an integrated tablet computer, speaker, microphone, digital camera, and/or a wireless router. The chassis can also include a set of shelves or charging locations on which the set of mobile devices can be stored and charged (e.g., via connection to a charging cable integrated with the hub device or via an inductive charging system integrated with the hub device). The hub device can include a set of user interfaces (e.g., touch screen, physical keyboard, speech recognition software executing on the tablet computer) such that an operator in the production facility can input data into the hub device and interact with prompts or training content displayed at the hub device. Alternatively, the system can include at least one user authentication input device which authenticates the identity of the operator via a biometric or non-biometric form of identification. Thus, when installed at an entrance to a production facility, the hub device acts as an easily accessible base station from which operators can check-out mobile devices for use within the production facility.

In one implementation, the hub device is configured to mount to a wall within the production facility in order to improve operators' physical and/or visual access to the hub device without occupying valuable floorspace within the production facility. Alternatively, the hub device can be configured to mount within an aseptic gowning area in order to make mobile devices available to operators during the gowning process such that the operators may place the mobile devices under personal protective equipment such as face shields. Alternatively, the hub device can be mounted to a mobile cart such that the hub device can be effectively positioned for usage by the operators In another implementation, the hub device is configured to be water resistant (e.g., IP67 rating) and chemically resistant to facilitate frequent cleaning (such as with Spore-Klenz or other aggressive chemicals regularly used for facility decontamination) and sterilization of the hub—such as through vaporized hydrogen peroxide or another sterilization method—in order to maintain GMP within the production facility. For example, the chassis of the hub device can be manufactured from stainless steel (e.g., 316L stainless steel), medical grade plastics (e.g., polypropylene), borosilicate glass, and/or any other chemically and thermally resistant material. The hub device can also include a cover or protective shell that is removably attached to the hub unit and/or the shelves for the mobile devices to fully enclose them during the cleaning process. Alternatively, hub device can include an attached enclosure to store the mobile devices protected from any harsh cleaning chemicals or sterilization processes. Additionally, the internal enclosures can include UV lights to reduce the microbial load on the surfaces of the mobile devices stored at the hub device.

In yet another implementation, as shown in FIG. 4, the hub device can include a shelf 130 and a set of charging points 120 for charging mobile devices 200 and a projected and/or virtual display screen 150. The hub device can include a video projector 160 mounted within a housing in an alternate location with the proper Keystone effect to prevent image distortion of the projected image at the projected display screen 150. In this implementation, the system can generate a projected image projection mapped onto a piece of equipment or onto other areas within the facility to provide contextual information to the operators. Alternatively, the system can include a virtual display for an augmented reality, a virtual reality, a mixed reality, and/or a holographic device as a display device. In addition the hub device can include wireless charging stations such as via inductive charging stations or through wireless charging at a longer distance. The shelf 130 of the hub device can include additional sensors such as an integrated camera 170, a Bluetooth beacon for spatial localization, a wireless network device 180 which transmits a wireless signal to the mobile devices 200 or other hub devices 100, or other sensor devices located within the production facility.

In yet another implementation the system can include a primary hub device with multiple smaller hub devices distributed throughout the facility. The smaller hub devices may be connected to the primary hub device via a network connection such as an internet radio connection, a local network connection or a distributed network connection such that each hub device connects to at least one primary hub device within the facility. The smaller hub units can include sensor devices for the mobile devices within the facility and can include charging setups for those devices. The smaller hub units can additionally include input devices, such as a keyboard for entering in data, cameras, and an authentication input device for authentication of completed tasks within the different operating areas of the facility. The system can include biometric or non-biometrics means of authentication of the operator. Thus, the system can capture initial login credentials with which the system can log an operator into the mobile device, authenticate completion of a scheduled manufacturing operation by the operator, and/or verify, by a second operator, that a first operator completed a scheduled manufacturing operation. For example, the second operator may observe the first operator in real-time as they are executing a scheduled manufacturing operation to ensure that it is executed properly (e.g., by observing the technique used to complete the scheduled manufacturing operation) and subsequently authenticate, at the system via the input device, that the scheduled manufacturing operation was successfully executed. In another example, the second operator may review a final product produced as a result of a scheduled manufacturing operation and, based on the state of the final product, authenticate that the scheduled manufacturing operation has been properly executed by the first operator. The system can access a series of verification or authentication steps corresponding to each scheduled manufacturing operation in order to enable proper verification of the scheduled manufacturing operation.

The hub device can include a set of charging points, each corresponding to a mobile device in the set of mobile devices. In one implementation, the hub device includes a set of shelves extending outward from the hub device, mounted to a wall, with charging cables integrated into the shelves. Thus, an operator may place a mobile device onto a shelf and insert the charging cable into the mobile device to initiate charging. In another implementation, the hub device can include a set of docking ports configured to engage directly with the mobile device such that manipulation and insertion of cables into the mobile devices is not required to initiate charging of the mobile devices. In yet another implementation, the hub device can include a set of induction charging locations within the set of shelves such that compatible mobile devices can be wirelessly charged while resting on the set of shelves of the hub device. In an additional implementation, the system can include storage for a set of swappable batteries for the mobile devices such that operators in the production facility can quickly replace the batteries of the mobile devices. In a further implementation, the hub device can include a set of auxiliary shelves that can expand the capacity of the hub device in order to charge additional mobile devices, batteries, accessory devices, accessory cameras, sensor devices, or to store these accessory devices to be utilized with the mobile devices and/or the hub unit.

The hub device can indicate or display the charging status (e.g., the current battery capacity) of each mobile device that is currently charging at the hub device via a display or via lighted indicators integrated with the chassis of the hub device near to each charging point of the hub device. Thus, an operator can select a mobile device for use within the production facility that is sufficiently charged. The system can recommend the mobile device to the operator characterized by the greatest level of charge, the mobile device characterized by specifications appropriate for or suited to the scheduled manufacturing operations assigned to the operator (e.g., a mobile device with intrinsically safe ATEX specifications for operating in a facility requiring an explosion proof device or for manufacturing operations involving flammable solvents, a mixed reality device suited for completion of a particular manufacturing operation), or the operator's personal device that has been assigned to them.

In one implementation, the hub device can include a QR code emblazoned on the chassis of the hub device. The QR code can represent information regarding the location of the hub device within the production facility and the identity of the hub device (e.g., in order to coordinate direct calls to the hub device). Thus, an operator using a mobile device may scan the QR code of the hub device to obtain additional information about the hub device. In this implementation, the mobile device can automatically localize itself within the production facility based on its proximity to the hub device upon scanning the QR code of the hub device. In another implementation in which the hub device is located at a fixed location on a facility wall, the hub device can provide a point-cloud identification of the hub device to the mobile device upon scanning the area. In alternate embodiments the hub device may contain a Bluetooth beacon, a radio transmitter, or other form of electronic identification to provide identification to the mobile device. In another implementation, the hub device can be installed on a cart or other mobile platform (e.g., a vehicle), thereby enabling operators to move the hub device toward a location of a scheduled manufacturing operation within the production facility. For example, the hub device can be installed on a wheeled cart and an operator may move the cart toward a location at which the operator plans to execute a scheduled manufacturing operation. The hub device can then more effectively observe the scheduled manufacturing operation with an integrated camera and more effectively issue prompts and/or warnings to the operator during one or more scheduled manufacturing operations.

3.2 Mobile Devices

Generally, the system can include a set of mobile devices such as a set of augmented reality headsets, each augmented reality headset including a heads-up display, eyes-up display, head-mounted display, or smart glasses configured to render augmented reality content for an operator wearing mobile device. Alternatively, the mobile device can include a Wi-Fi-enabled smartphone, tablet, or wearable camera device connected to a separate augmented reality device, such as: removably attachable to an operator's coveralls, clean room gowning, and/or personal protective equipment; carried in the operator's hand; or worn on a lanyard on the operator's neck. The mobile device may be separate or integrated into the Personal Protective Equipment (PPE) for the operator to wear within the facility. The hub device may additionally contain storage for the PPE to be used along with the mobile device, such as storing the safety glasses or goggles to be used with the mobile device in the facility for safety purposes as required. Alternatively, the mobile device may be a robotic device such as a robotic drone, a mobile robot (wheeled or legged), an articulating arm, and/or a motorized mobile device.

Furthermore, the mobile device can include: a suite of sensors configured to collect information about the mobile device's environment; local memory (and/or connectively to cloud-based memory) configured to (temporarily) store a localization map of a room; and a controller configured to determine a location of the mobile device in real space, such as based on the localization map, a hierarchy of localization methods, and data collected by the suite of sensors. For example, the mobile device can include: a depth camera paired with a 2D color camera; and/or a stereoscopic color camera. Each of these optical sensors can output a video feed containing a sequence of digital photographic images (or "frames"), such as at a rate of 20 Hz, and the controller can compile concurrent frames output by these optical sensors into a 3D point cloud or other representation of surfaces or features in the field of view of the mobile device. Following receipt of a localization map of a room occupied by the mobile device and generation of a 3D point cloud (or other representation of surfaces or features in the field of view of the mobile device), the controller can implement point-to-plane fitting or other techniques to calculate a transform that maps the 3D point cloud onto the localization map in order to determine the position of the mobile device within the workspace area. The mobile device can additionally or alternatively include a motion sensor and/or a depth sensing device, and the mobile device can generate a map of the working space area and track its location and orientation within this map based on features detected in photographic and/or depth feeds recorded by these devices. The mobile device can similarly track its location by comparing constellations of features detected in photographic and/or depth feeds recorded by these devices to a 3D map of the facility supplied by the remote computer system. Additionally, the mobile device can execute other localization techniques such as signal-to-noise-ratio-based beacon localization utilizing a set of wireless beacons distributed throughout the work area and production facility.

The mobile device can also: implement object detection and object recognition techniques to detect and identify equipment, materials, consumables, and or other components or objects within the workspace based on constellations of features detected in photographic and/or depth feeds recorded by these sensors; implement methods and techniques similar to those described above to localize these objects within the workspace; track the position of the mobile device relative to these objects; and detect interactions between the operator and these objects accordingly. Thus, by tracking equipment, particularly mobile equipment, the system may verify the completion of scheduled manufacturing operations included in a critical path and may initiate cascades of other steps based on the presence and location of the equipment, consumables, raw materials, mobile devices, and operators within the facility workspaces.

However, the mobile device can include any other type of sensor in any other quantity and can implement any other method or technique to calculate its pose within a room based on a localization map of the room and data recorded by these sensors.

In one implementation, the mobile device can include a wireless communication module (e.g., a wireless transceiver) configured to wirelessly communicate with the hub device. In this implementation, the mobile device can transmit, in real-time, a video feed captured by the camera of the mobile device to the hub device for further processing and transmittal to an observer of a scheduled manufacturing operation.

In another implementation, the mobile device does not include a wireless communication module and is not physically capable of wirelessly transmitting a video feed to the hub device. In this implementation, the mobile device can include a video cache configured to store a video feed depicting a set of scheduled manufacturing operations for upload to the hub device upon reconnection of the mobile device to the hub device (e.g., via a wired connection or near-field communication connection).

3.3 Stationary Devices

Generally, the system can also include a set of stationary devices such as closed-circuit digital video cameras, 360-degree cameras, LIDAR sensors, passive infrared sensors, infrared cameras, or other types of cameras or sensors installed within the production facility. More specifically, the set of stationary devices are configured to wirelessly communicate with the hub device such that the system can route data feeds (e.g., video feeds, lidar point clouds, infrared images) from the set of stationary devices to a remote observer via the hub device. Thus, the system can provide additional contextual data pertaining to a production line within the production facility during a tethering session.

In one implementation, the system can include a stationary device in the set of stationary devices that is a first-party device configured to interface directly with the hub device. Alternatively, the system can include a stationary device in the set of stationary devices that is a third-party device and is configured to communicate with the hub device via a common data format or application programming interface.

In another implementation for which the system is deployed to an air-gapped production facility, the set of stationary devices are connected to the hub device via a wired connection (in order to prevent remote reception of data transmitted by the set of stationary devices).

4. User Verification

Generally, in Block S110, the system can receive a set of operator credentials associated with a particular operator via the user interface of the hub device. More specifically, the system can receive or capture a set of operator credentials such as a username, password, email address, personal identification number, badges or key fobs, and/or biometric identifiers such as a set of fingerprint features, a set of facial features, and/or a set of retinal/iris scan features. The system can then compare the set of operator credentials to a set of authorized operator profiles for the production facility and, upon matching the set of operator credentials to an operator profile in the set of authorized operator profiles, the system can enable the operator to access the set of mobile devices stored at the hub device (e.g., by mechanically releasing the mobile devices from the hub device or by electronically activating the mobile devices). Thus, the system ensures that unauthorized users cannot access the mobile devices within the production facility and can identify the operator currently present at the hub device based on the physical act of receiving operator credentials via the user interface of the hub device. Alternatively, the system authenticates an operator who may then wears the wearable mobile device within the facility. The wearable mobile device can include a sensing device that can detect whether the operator is wearing the device while in the facility, such as via a capacitive sensor, a heart-rate monitor, a temperature sensor, or any other sensor type. The system may track the mobile device through the facility and determine the operator location within the facility, particularly the location of the mobile device during the execution of scheduled tasks to confirm the operator is the user that is performing the tasks as a form of verification within that specific area. The system can also receive manual verification of the completion of each scheduled manufacturing operation via an input device included in the hub device. Additionally or alternatively, the system may automatically identify the operator as the performer of the scheduled manufacturing operation based on the location of the operator being in close physical proximity to the location of the scheduled manufacturing operation.

5. Scheduled Manufacturing Operations

Generally, upon receiving a set of operator credentials, the system can access an operator schedule associated with the operator credentials in Block S120. The operator schedule can include a set of schedule manufacturing operations along the critical path and can indicate, for each scheduled manufacturing operation, whether the scheduled manufacturing operation is scheduled for observation by an observer in a tethering session. More specifically, the system can access an operator schedule defining: a first scheduled manufacturing operation; and a first observer of the first scheduled manufacturing operation, the first observer characterized by a first set of observer credentials. Thus, the system can link a set of observer credentials, a set of operator credentials, and any additional metadata pertaining to a scheduled manufacturing operation, in order to identify the security and/or privacy measures to apply to the video feed initiated between the operator and the observer during a tethering session between the operator and the observer.

In one example, the system can identify that a first operator is scheduled to perform a procedure with observation by a first observer via a tethering session. Upon identifying that an observer is scheduled to attend a tethering session, the system can access an observer profile corresponding to the observer and extract a set of observer credentials indicating access privileges of the observer within the production facility. Thus, the system can select a set of video and/or data feeds from the operator's mobile device and/or the set of stationary devices and augment the selected video and data feeds based on the access privileges of the observer.

In one implementation, the system can receive a selection from a hub device administrator to manually select the access privileges for the observers in the session. For example, a hub device administrator may initiate a video feed with an external vendor to help diagnose and fix an issue with a piece of equipment and quickly limit the access privileges of the external vendor immediately prior to the session. Alternatively, the system can schedule which devices, which cameras, which sensor data, and which equipment may be viewable for a scheduled session that is to be streamed to remote observers via the hub device. In alternate implementations, the hub device can schedule batches, procedures, operations, and tasks to specific users as a task management system. In this implementation, the system displays the task updates and the accompanying schedules for these tasks on the mobile devices corresponding to the operators for which the tasks were scheduled. In this implementation, the system can prompt operators with instructions while an operator performs scheduled manufacturing operations, which may include a single setup operation followed by a set time period for processing, such as with an automated equipment cleaning, decontamination, and/or sterilization cycle which may take minutes to setup and hours to complete the process. The system can prompt an operator with instructions to execute an initial setup operation and, subsequently, to complete other tasks from a different procedure while that operation is processing. The system can schedule some manufacturing operations earlier than others based on the timing and proximity of the tasks relative to other scheduled manufacturing operations. For example, the system can locate and/or track an operator as being adjacent to a mobile tank as determined by a nearby hub device monitoring the mobile device location. In this example, the system has scheduled a sterilization operation for the operator at the mobile tank. Upon sterilization of the mobile tank by the operator, the system can automatically prompt, via the hub device, the operator to complete other operations while the sterilization process is running. Alternatively, while the sterilization process is running, the hub device can adaptively schedule other critical path operations for the operator to complete from a set of manufacturing operations in a batch record. Thus, the system can prompt operators in the facility to efficiently complete production critical operations (i.e., manufacturing operations in the critical path) by coordinating operations, based on order, duration, and location within the facility.

5.1. Training Prompts

Figure 5:
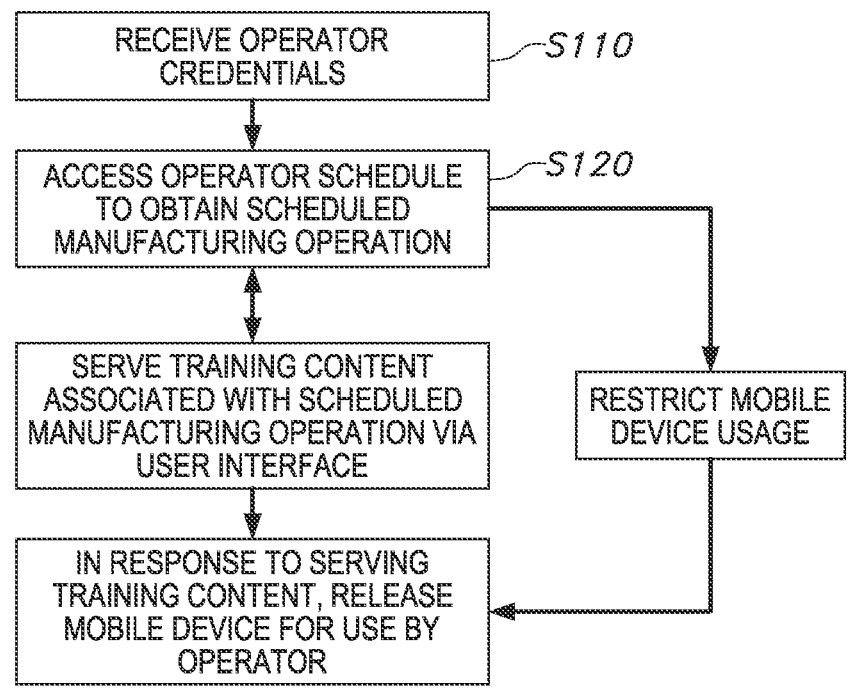
FIG. 5 is a flowchart representation of one variation of the method.

As shown in FIG. 5, upon identifying the operator and identifying any scheduled manufacturing operations for the operator, the system can generate training prompts or serve training content associated with the scheduled manufacturing operations to the operator directly from the hub device (e.g., via a display or touchscreen of the hub device). Additionally, the hub device can restrict usage of the mobile devices by the operator before the hub device has finished serving the training content to the operator. The system can serve training content to the user in the form of text displayed at the hub device, video or images displayed at the hub device, and/or audio generated at the hub device. In addition to training content, the system can also serve general notifications—such as broadcasted audio, text, or visual messages—or updates pertaining to the production facility such as a new set of safety precautions, the installation of a new machine on a production line, or an introduction of a new schedule for operators within the production facility. Thus, by only releasing the mobile devices for use by operators upon serving the training content to the operator via the hub device, the system ensures that operators review intended training content prior to beginning work within the production facility.

5.2 Viewable Regions and Restricted Regions

Generally, upon accessing a set of observer credentials, the system can identify a set of viewable regions of the production facility (e.g., a particular production line) for the observer in order to select video feeds for routing to the observer during a tethering session and/or to augment these video feeds to obscure regions of the production facility that are confidential to the observer (e.g., regions outside of this set of viewable regions). More specifically, the system can access a set of observer credentials including a set of viewable regions of the production facility. Alternatively, the system can access a set of observer credentials that includes a set of restricted regions of the production facility. Thus, the system can identify regions to obscure from video feeds depicting the production facility positively (e.g., via explicit identification of a restricted region) or via omission from a viewable region. Additionally, the system can access a set of observer credentials that explicitly identify viewable regions or restricted regions via coordinates relative to a map or other representation of the production facility. Alternatively, the observer credentials can simply specify a category or level of access of an observer.

In particular, the system can: categorize regions of the production facility by client, by confidentiality access level, or according to any other categorization scheme; and, upon accessing access privileges of the observer, the system can identify a viewable region of the facility including the regions categorized as viewable to the observer based on the access privileges of the observer. Thus, upon initiating a tethering session between an operator within the facility and a remote observer, the system can ensure that the observer is only capable of viewing regions of the production facility that pertain to their specific interests.

In one implementation, the system can also identify particular machines, displays, or data types to which the observer does not have access. For example, the system can indicate that an observer does not have access to the data displayed on the user interface of particular machines operating on a production line that is otherwise viewable by the observer. Thus, upon capturing a region of the production facility including the particular machine, the system can augment the video feed to obscure the user interface of the particular machine, thereby enabling the observer to view the rest of the viewable region while maintaining confidentiality of the information displayed on the particular machine.

In one implementation, the system can also selectively obscure personal identifying information present within the facility. Thus, the system can protect operators who may not have given consent to be viewed or recorded or may have subsequently provided a right-to-be-forgotten notice after their employment is terminated.

Generally, the system can obscure regions of any visual feed presented to an observer of a scheduled manufacturing operation and can obscure any object within a visual feed, such as a 360-degree camera video feed, a thermal display or other sensor type, a haptic display, a depth scanner display, a virtual display, an augmented display, a mixed reality display, or a holographic display.

6. Device Assignment

Generally, in Block S130, the system can detect displacement or disconnection of a particular mobile device in the set of mobile devices connected to the hub device. More specifically, the system can detect displacement or disconnection of a mobile device from a charging point at the hub device, where the mobile device is associated with a device identification number (hereinafter, "device ID"). In one implementation, upon connecting to the hub device via a charging cable or dock at a charging point of the hub device, the mobile device reports its device ID to the hub device. The hub device can then store this device ID in association with the charging point such that, when the mobile device is removed or displaced from the charging point the system can immediately identify the device ID of the device that has been displaced.

In one implementation, the system can detect that a mobile device has been removed or displaced from a charging point of the hub device by detecting disconnection of a charging cable from the mobile device. In implementations of the hub device including wireless charging points, the hub device can detect displacement or disconnection of a mobile device from the wireless charging point by detecting a change in capacitance and/or resistance in the charging circuit. In another implementation, the hub device can include load sensors within a shelf that supports a mobile device and can detect a reduction and/or a change in the load at the load sensor indicating that a mobile device has been removed from the shelf of the hub device. In another implementation, the hub device can include a magnetic sensor and can detect the presence of a magnet on the device and when it is removed from the shelf of the hub device. In yet another implementation, the hub device can include an integrated digital camera, which can record images of the set of mobile devices charging at the hub device and can detect, via computer vision techniques, displacement or movement of these mobile devices from charging points of the hub device.

Generally, in Block S140, upon detection of displacement of a mobile device, the system can assign the device ID of the displacement mobile device to an operator that has recently signed-in to the hub device. More specifically, the system can, in response to detecting displacement of a first mobile device from the hub device within a threshold time interval of receiving a set of operator credentials, associate the first device ID with the operator corresponding to the received set of user credentials. For example, the system can receive, at the hub device, a set of operator credentials for a first operator; within a threshold time interval (e.g., two minutes), the system can detect that a first mobile device associated with a first device ID has been displaced from the hub device; and, in response to detecting this displacement, assign the first device ID to the first operator. Thus, the system can leverage the physical input of operator credentials to the hub device to associate a particular operator with a particular mobile device, thereby enabling the system to route video and/or audio feeds to and from this mobile device for tethering sessions involving the particular operator.

In one implementation, the system can increase the threshold time interval for assigning a mobile device to an operator based on a duration of training content served to the operator, in response to receiving the operator credentials of the operator. For example, the system can, in response to serving training content of a first duration, increase the threshold time interval by the first duration.

In another implementation, the system can: record a video feed at the hub device (e.g., via an integrated digital camera of the hub device); execute computer vision techniques to identify the presence of an operator near to the hub device; receive operator credentials identifying the operator near the hub device; detect displacement of a mobile device concurrent with the presence of the operator near to the hub device; and assign the device ID of the mobile device to the operator based on the presence of the operator and the timing of the displacement of the mobile device from a charging point of the hub device.

Once the system has assigned a device ID to an operator, the operator may begin to perform manufacturing operations at the production facility while utilizing the assigned mobile device.

Figure 6:
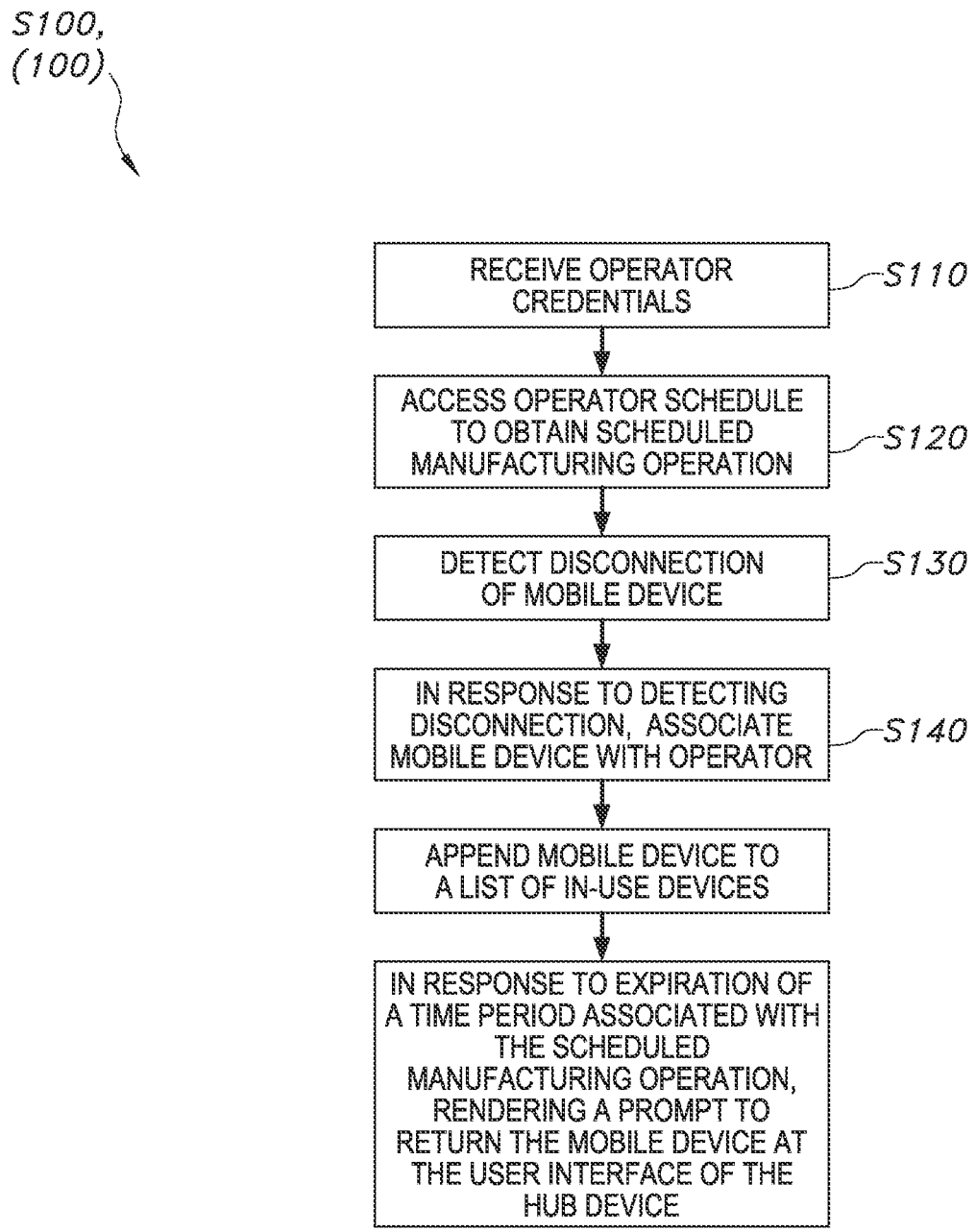
FIG. 6 is a flowchart representation of one variation of the method.

As shown in FIG. 6, the system can track and/or monitor the set of mobile devices deployed within the production facility and issue prompts (e.g., via the user interface of the hub device or via a prompt displayed at the mobile device) to replace mobile devices that remain deployed within the production facility outside of the duration of a scheduled manufacturing operation of an associated operator. More specifically, the system can: in response to detecting disconnection of the first mobile device from the hub device, append the first device ID to a list of in-use devices; in response to not detecting reconnection of the first mobile device with the hub device and in response to expiration of a time period associated with the first scheduled manufacturing operation, render a prompt to reconnect the first mobile device to the hub device at the user interface of the hub device. Alternatively, the system can: in response to detecting disconnection of the first mobile device from the hub device, append the first device ID to a list of in-use devices; and, in response to not detecting reconnection of the first mobile device with the hub device and in response to expiration of a time period associated with the first scheduled manufacturing operation, render a prompt to reconnect the first mobile device to the hub device at the first mobile device. Thus, the system can ensure prompt return of mobile devices after scheduled manufacturing operations, thereby preventing shortages of mobile devices charging at the hub device and increasing charging time for the set of mobile devices.

7. Tethering Session

Generally, the system can initiate a tethering session between the operator and assigned mobile device and a remote observer. More specifically, the system can route a video feed from the first mobile device to the first observer based on the first device ID and the first set of observer credentials in Block S150. In some implementations, the system can additionally modify the video feed to obscure regions of the manufacturing floor outside of the first viewable region. Thus, the system can enable POV observation of tasks performed by an operator within the production facility by a remote observer without exposing confidential regions of the production facility to a remote observer without sufficient credentials to view these confidential regions.

The system can initiate a tethering session automatically (e.g., at a time specified by a scheduled operation for which remote observation is prescribed) or in response to input to initiate the call by the operator or by the remote observer. For example, the operator may issue a voice command to the mobile device in order to initiate a tethering session. Alternatively, the remote observer may call in to the system, while specifying the operator as the recipient or by following a link provided in association with the scheduled tethering session.

7.1 Wireless Video Feed Routing

Figure 7:
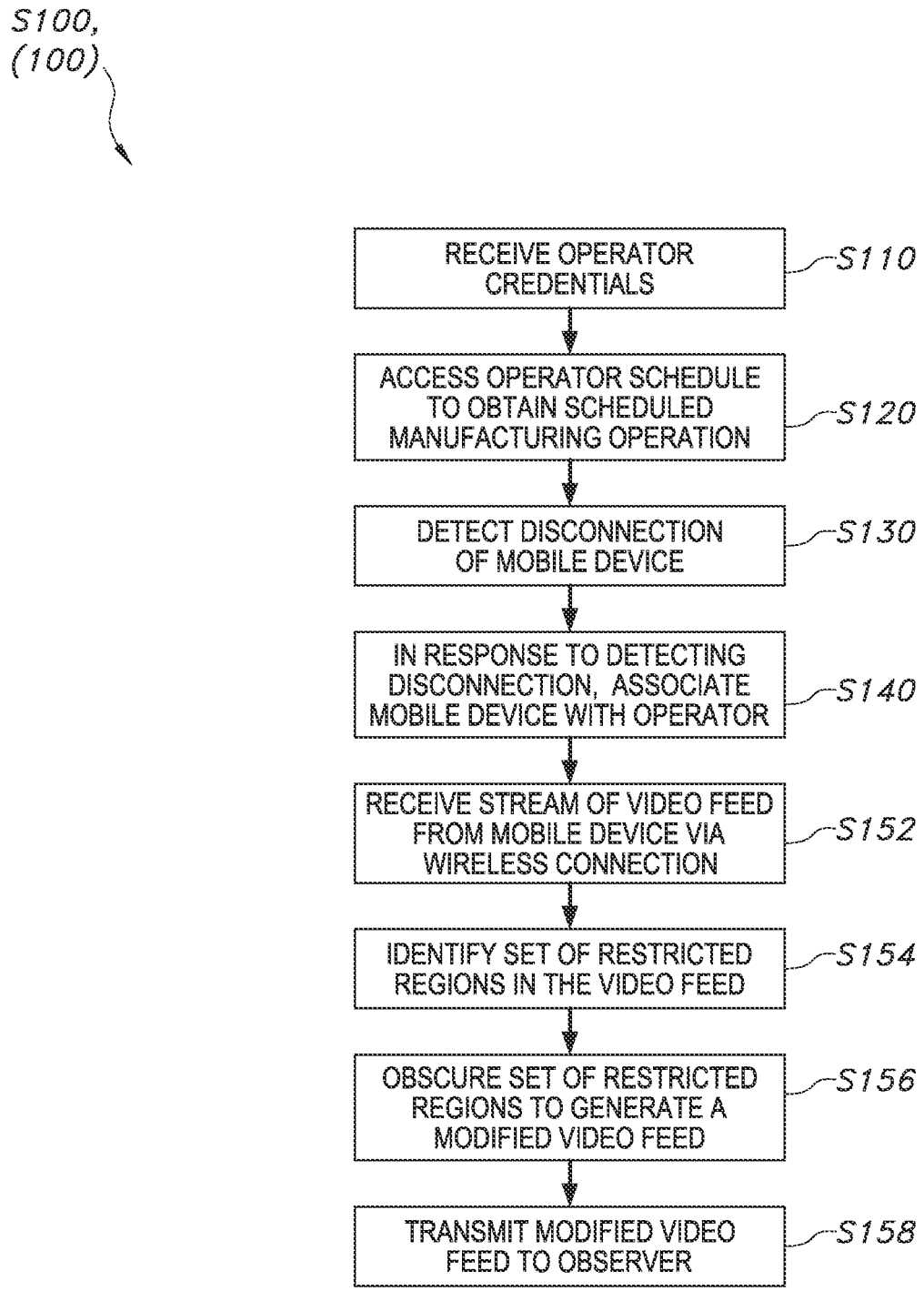
FIG. 7 is a flowchart representation of one variation of the method.

As shown in FIG. 7, the system can receive the first video feed from the first mobile device via a wireless connection between the first mobile device and the hub device. More specifically, the system can route a POV video feed from the mobile device by: recording a series of video frames at the mobile device via an integrated digital camera of the mobile device; transmitting the recorded series of video frames to the hub device via a local area network and/or via a short-range wireless protocol; and routing the series of video frames to a device of the remote observer via the internet. Thus, the mobile devices need only be connected to the local area network in the production facility in order to communicate with the hub device, thereby limiting transmission into and out of the production facility and, as a result, improving the data security of the production facility.

In this implementation, the mobile device can record and transmit the video feed to the hub device and the hub device can: localize the hub device within the production facility based on the video feed; obscure restricted regions of the production facility depicted in the video feed to generate a modified video feed; and transmit the modified video feed to the observer of the session based on a set of observer credentials. Thus, the system can offload the processing burden for modifying the video feed from the mobile device to the hub device, thereby improving battery life and/or processing performance of the mobile device without altering the quality of the modified video feed.

7.2 Air-Gapped Mobile Device Routing

Figure 8:
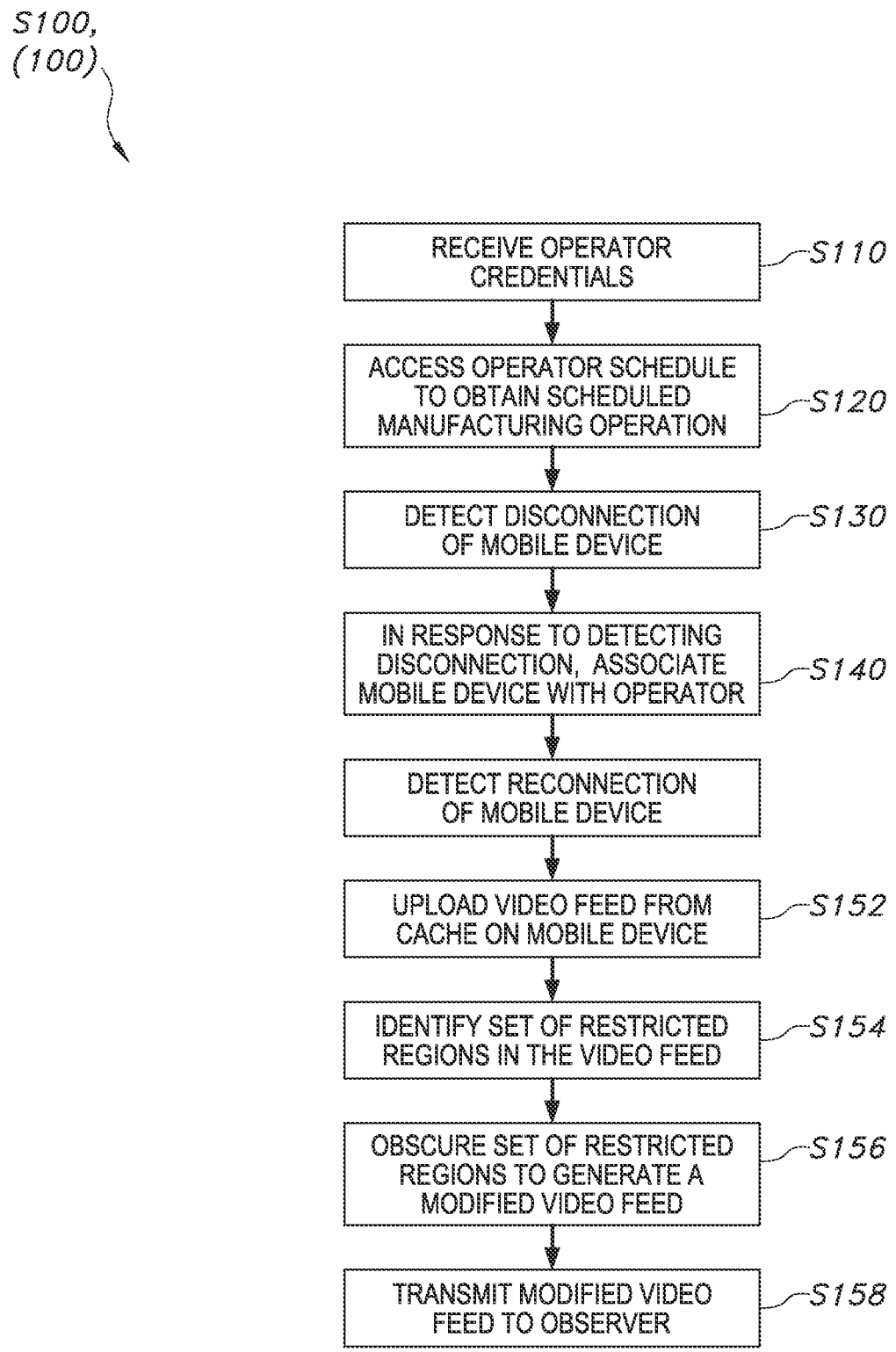
FIG. 8 is a flowchart representation of one variation of the method.

As shown in FIG. 8, in applications in which the set of mobile devices are air-gapped (i.e., not long-range wirelessly capable) during a scheduled manufacturing operation (e.g., for security purposes), the mobile device can store a video feed recorded during a scheduled manufacturing operation in a local cache on the mobile device. The hub device can then detect that the mobile device has been returned to the hub device (e.g., by detecting a wired or short-range wireless connection) and can upload the completed scheduled manufacturing operations, incomplete scheduled manufacturing operations, data/metadata associated with the completion of the scheduled manufacturing operation, and the video feed from the cache of the mobile device to the hub device before modifying the video feed and routing the video feed to an observer of the scheduled manufacturing operation depicted by the video feed. More specifically, the system can, in response to detecting a direct connection of the first mobile device to the hub device based on the first device ID: upload the first video feed from the first mobile device to the hub device; and transmit the first video feed from the hub device to the first observer based on the first set of observer credentials. Thus, the system can enable a recorded tethering session for later transmission to an observer specified by a set of observer credentials.

Additionally, the system can automatically identify scheduled manufacturing operations corresponding to cached video feeds based on timestamps and concurrent locations of the mobile device and a schedule of the operator of the mobile device. In one implementation, upon upload of the cached video feed to the hub device, the hub device can parse the cached video feed and crop the cached video feed into individual video segments representing each scheduled manufacturing operation completed by the operator of the mobile device. The hub device can then stream or otherwise transmit the individual video segments to observers of the schedule manufacturing operation associated with each video segment. In one example, the hub device can identify a segment of the cached video feed based the location of the mobile device in the facility relative to a location for the scheduled manufacturing operation. Alternatively, the hub device can classify frames of the video via a machine learning algorithm to identify the scheduled manufacturing operation being performed for a particular video segment in the cached video feed.

7.3 Location Detection and Augmented Reality

Generally, the system can identify the location and field of view of the mobile device based on the video feed of the mobile device and, based on this location and field of view, augment each video frame in order to obscure regions of the production facility outside of the viewable region of the remote observer. More specifically, the system can localize the mobile device by: detecting a proximity of the mobile device to a set of wireless beacons placed throughout the production facility and estimating the location of the mobile device via multilateration; detecting a position of an operator in a closed-circuit video feed via computer vision techniques and estimating the location of the operator via photogrammetry; calculating a point cloud of features at the mobile device and matching the detected point cloud relative to a 3D map of the production facility; and/or some combination of these processes. Thus, the system can: receive the first video feed from the first mobile device; identify a first set of restricted regions depicted in the first video feed; obscure the first set of restricted regions in the first video feed to generate a first modified video feed; and transmit the first video feed to the first observer.

Upon localizing the mobile device, the system can identify features in the video feed of the mobile device that correspond to confidential regions of the production facility. For example, the system can project a floorplan of the production facility indicating the viewable region corresponding to the remote observer into the video feed of the mobile device. The system can then identify features based on visual markers strategically placed on the equipment or area to define the boundaries, electronic beacons, or a 3D point cloud generated by the mobile device that fall outside of the viewable region. More specifically, the system can generate a first 3D point cloud representation of the production facility based on the first video feed; localize the first mobile device in the production facility based on the first 3D point cloud to calculate a first series of locations of the first mobile device in the production facility during the first video feed; and identify the first set of restricted regions depicted in the first video feed based on the first series of locations of the first mobile device and a field of view of the first mobile device.

Once a set of features and/or objects have been identified as being outside of the viewable region of an observer of a tethering session, the system can augment the video feed to remove or obscure these features from the video feed. More specifically, the system can receive the first video feed from the first mobile device; identify a first set of restricted regions of the production facility outside of the first set of viewable regions depicted in the first video feed; obscure the first set of restricted regions to generate a first modified video feed; and transmit the first modified video feed to the first observer. In one implementation, the system can render a virtual wall within the video feed that blocks confidential regions of the production facility within the video feed. This virtual wall may be present in a 360-video feed blocking or obscuring the view in that specifically defined area. Alternatively, the system can blur (or otherwise filter) areas of the video feed that correspond to the confidential regions of the production facility, thereby rendering these areas of the video feed unintelligible to the remote observer.

In yet another implementation, the system can crop regions of the video feed across multiple frames of the video feed depicting restricted regions of the production facility. Alternatively, the system can remove frames from the video feed (while maintaining audio data for the time period occupied by the frame) that depict restricted regions of the production facility. Thus, the system can: receive the first video feed from the first mobile device; identify a first set of restricted regions depicted in the first video feed; crop the first video feed to remove the first set of restricted regions depicted in the video feed; and transmit the first video feed to the first observer. In this implementation, the video feed maintains frozen image frame from before the restricted area until the operator with the mobile device passes through the restricted area where the live video feed picks up once again.

However, in one implementation, the system can include audio from the cropped period of the video feed.

In one implementation, the system can also combine multiple secondary (e.g., closed circuit) video feeds within the production facility in order to locate a mobile device within a production facility and subsequently modify a video feed captured by the mobile device. More specifically, the system can receive a secondary video feed from a second device, the secondary video feed concurrent with the first video feed and depicting the first operator and the first mobile device; localize the first mobile device in the production facility based on the first video feed and the secondary video feed to calculate a first series of locations of the first mobile device in the production facility during the first video feed; and identify the first set of restricted regions depicted in the first video feed based on the first series of locations of the first mobile device and a field of view of the first mobile device. Thus, the system can leverage secondary video feeds of the production facility to improve localization of the mobile device—and, therefore, the accuracy of obstructions applied to the video feed—via photogrammetry.

In another implementation, the system can further improve localization of a first mobile device based on a second video feed from a second mobile device also deployed to the production facility. More specifically, the system can: receive a second video feed from a second device, the second video feed concurrent with the first video feed and depicting the first operator and the first mobile device; localize the first mobile device in the production facility based on the first video feed and the second video feed to calculate a first series of locations of the first mobile device in the production facility during the first video feed; and identify the first set of restricted regions depicted in the first video feed based on the first series of locations of the first mobile device and a field of view of the first mobile device. Thus, the system can utilize all available video feeds, including those video feeds recorded by other mobile devices, to cross-reference the series of locations calculated for a mobile device, thereby improving the accuracy of any modifications made to the video feed by the hub device.

7.4 Multi-Operator Feed Routing

Figure 9:
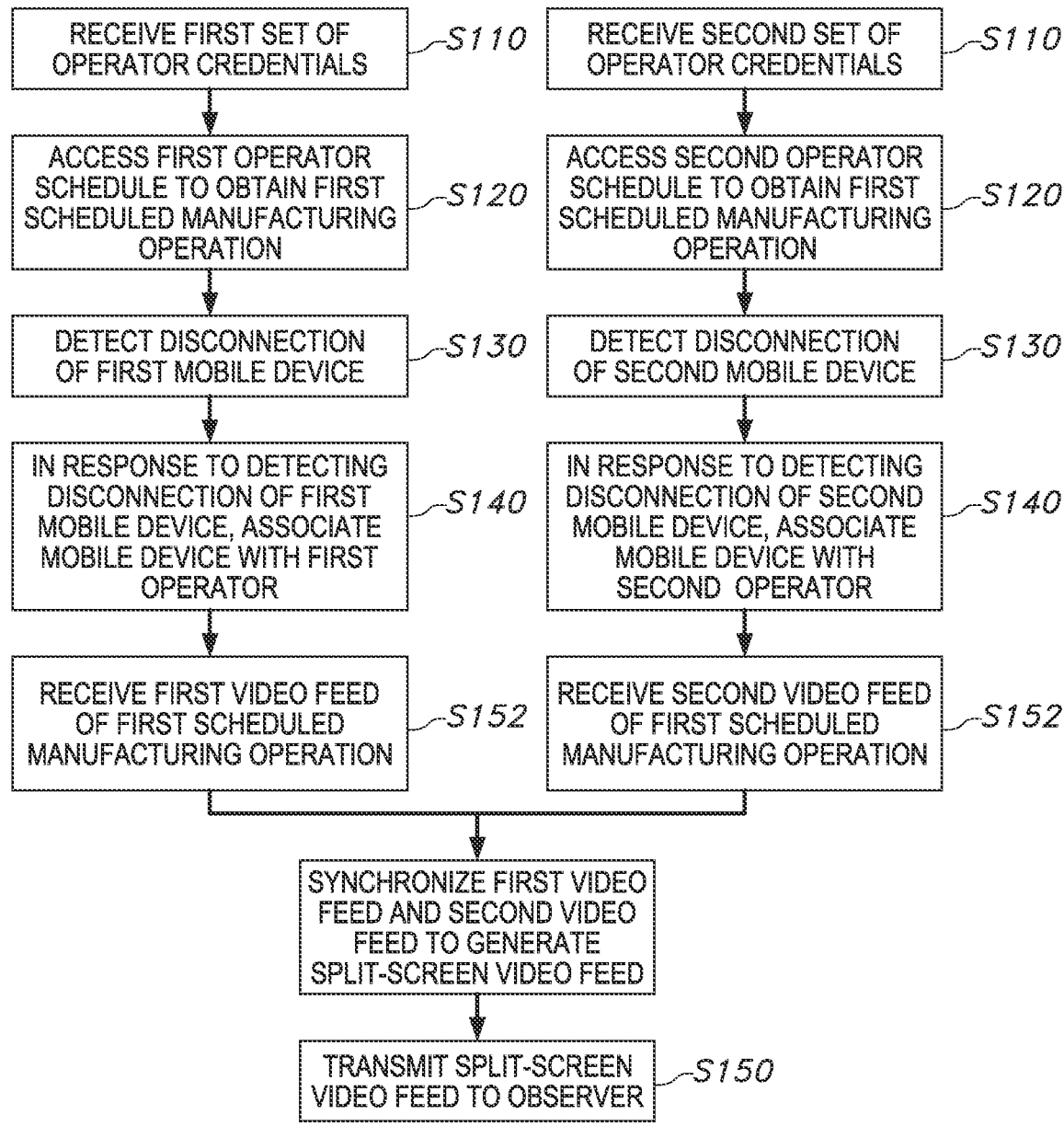
FIG. 9 is a flowchart representation of one variation of the method.

As shown in FIG. 9, the system can execute a multi-operator tethering session by synchronizing, compiling, and transmitting feeds from multiple mobile devices (associated with multiple operators within the production facility) to a single observer of the tethering session. More specifically, the system can: associate a second operator with a second mobile device and detect that the second operator shares a scheduled manufacturing operation with a first operator in the production facility. The system can then: receive the first video feed depicting the first scheduled manufacturing operation from the first mobile device; receive a second video feed depicting the first scheduled manufacturing operation from the second mobile device; synchronize the first video feed and the second video feed; and transmit a split-screen video feed to the first observer based on the first device ID, the second device ID, and the first set of observer credentials. Thus, the system can enable an observer to view a single scheduled manufacturing operation from the perspective of multiple operators.

In another implementation, the system can automatically detect a series of frames within a second video feed from a second mobile device of a second operator that depict the second operator performing the first scheduled manufacturing operation. The system can then, in real-time or upon upload to the hub device (e.g., for applications including air-gapped mobile devices), synchronize the series of frames of a second video with a first video feed depicting the first scheduled manufacturing operation. Thus, the system can automatically incorporate multiple video feeds into the same tethering session, even if the involvement of a second operator in the first scheduled manufacturing operation was not scheduled in advance (e.g., a second operator is called in or called over from executing another manufacturing operation to assist in the first scheduled manufacturing operation).

7.5 Stationary Device Video Feed Routing

In addition to routing the POV video feed from the mobile device to the device of the remote observer, the system can also route multiple videos and/or feeds from the set of stationary devices distributed throughout the facility to the remote observer. In one implementation, the system can identify a set of video feeds that include viewable regions of the production facility as candidate video feeds for the tethering session. The system can then: detect restricted regions depicted within these stationary video feeds and, in response to detecting a confidential region within a video feed, exclude the video feed from the tethering session. Alternatively, the system can generate a static video mask that occupies a portion of the video feed that depicts the confidential regions of the production facility. Thus, the system can identify the first set of restricted regions depicted in the secondary video feed; obscure the first set of restricted regions in the secondary video feed to generate a modified secondary video feed; and transmit the secondary video feed to the first observer.

In another alternative implementation, the system can generate a 3D point cloud based on features within the video feed and match the 3D point cloud to a 3D map of the production facility in order to calculate the location and field of view of the stationary device. The system can then detect areas within the video feed that correspond to confidential regions of the production facility and augment these areas of the video feed in order to obscure the confidential regions of the production facility.

7.6 Simultaneous Tethering Session Routing

Figure 10:
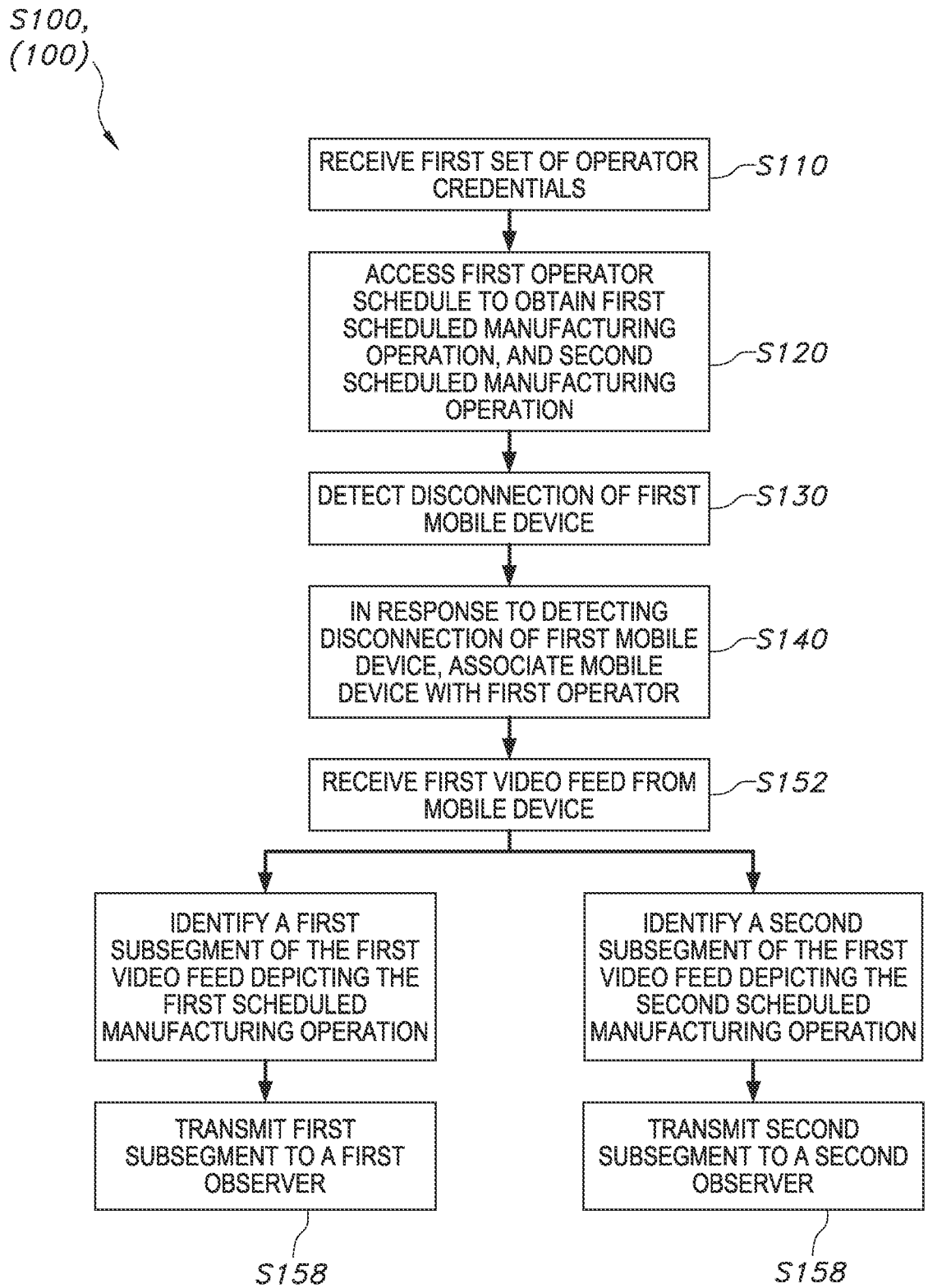
FIG. 10 is a flowchart representation of one variation of the method.

As shown in FIG. 10, the system can automatically distinguish between multiple scheduled manufacturing operations depicted in a single video feed from a mobile device associated with an operator within the production facility by calculating a series of locations of the mobile device during a set of scheduled manufacturing operations; and detecting a period of time for which this series of locations of the mobile device overlaps with specific regions of the production facility designated for specific scheduled manufacturing operations. The system can then identify specific segments of the video feed captured by the mobile device that correspond to specific scheduled manufacturing operations and route these segments of the video feed to distinct observers (which may also have distinct access privileges at the production facility).

In particular, the system can access the first operator schedule defining: the first scheduled manufacturing operation; a second scheduled manufacturing operation; the first observer of the first scheduled manufacturing operation; and a second observer of the second schedule manufacturing operation, the second observer characterized by a second set of observer credentials. The system can then receive a video feed from the first mobile device based on the first device ID; identify a first subsegment of the video feed depicting the first scheduled manufacturing operation; transmit the first subsegment of the video feed to the first observer based on the first set of observer credentials; identify a second subsegment of the video feed depicting the second scheduled manufacturing operation; and transmit the second subsegment of the video feed to the second observer based on the second set of observer credentials.

In one implementation, the subsegments of the video feed identified and routed to separate observers may be non-contiguous (e.g., if an operator is switching between multiple tasks for different clients). Thus, the system may cease streaming the video feed to an observer upon detecting that an operator in the tethering sessions has switched to executing a second scheduled manufacturing operation corresponding to a different tethering session.

8. Security and Safety Functions

Generally, the system can also execute security and safety functions for the production facility based on the hub device's physical position (generally in a highly accessible region of the production facility) and the hub device's function as a bottleneck for communication between the set of mobile devices and any external observers.

In one implementation, the system can detect a network security vulnerability, such as unauthorized access to the network, a data breach, or any networking security concern and, in response to detecting the network security vulnerability: halt the routing of the first video feed to the first observer; and store the first video feed in a local cache of the hub device. Additionally, the system can restrict or eliminate all communication from the hub device to a wide area network and only maintain communication with the set of mobile devices in order to continue to cache video feeds transmitted or uploaded to the hub device from the set of mobile devices.

Additionally, the hub device can include a hardware shut-off switch that, when actuated, safely disconnects the hub device from a wide area network and/or halts transmission of video feeds outside of the local area network of the production facility. Thus, the hub device can include an emergency shut-off switch configured to disconnect the hub device from an external network.

In another implementation, the system can also receive multiple data feeds such as temperature data, air quality data, or any other safety-related data for the production facility and, in response to the safety data indicating a safety concern, render a safety warning at the user interface of the hub device. For example, in response to detecting temperatures greater than a threshold temperature or air-quality lower than a threshold air quality within the production facility, the hub device can display and/or produce an audible alarm or warning at the user interface of the hub device, thereby indicating to operators in the production facility (who may be using air-gapped mobile devices) dangerous conditions within the production facility.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for remotely observing a manufacturing operation in a production facility comprising:
during a first time period:
at a hub device, receiving a first set of user credentials associated with a first operator, the hub device connected to a first mobile device; and
in response to separation of the first mobile device from the hub device, associating the first mobile device with the first operator; and
during a second time period following the first time period:
accessing a first set of observer credentials associated with a first observer;
accessing a first video feed from the first mobile device;
identifying a first set of restricted regions depicted in the first video feed based on the first set of observer credentials;
obscuring the first set of restricted regions in the first video feed to generate a first modified video feed; and
serving the first modified video feed to a first observer portal associated with the first observer.

2. The method of claim 1, wherein accessing the video feed from the first mobile device comprises:
in response to direct connection of the first mobile device to the hub device, uploading the first video feed from the first mobile device to the hub device; and
transmitting the first video feed from the hub device to the first observer based on the first set of observer credentials.

3. The method of claim 1, wherein accessing the first set of observer credentials associated with the first observer comprises, accessing a first operator schedule defining:
a first scheduled manufacturing operation; and
the first observer of the first scheduled manufacturing operation, the first observer characterized by the first set of observer credentials comprising the first set of restricted regions of the production facility.

4. The method of claim 1, wherein identifying the first set of restricted regions depicted in the first video feed comprises:
generating a first 3D point cloud representation of the production facility based on the first video feed;
localizing the first mobile device in the production facility based on the first 3D point cloud to calculate a first series of locations of the first mobile device in the production facility during the first video feed; and
identifying the first set of restricted regions depicted in the first video feed based on:
the first series of locations of the first mobile device;
the first set of observer credentials; and
a field of view of the first mobile device.

5. The method of claim 1:
further comprising receiving a secondary video feed from a second device, the secondary video feed concurrent with the first video feed and depicting the first operator and the first mobile device; and wherein identifying the first set of restricted regions depicted in the first video feed comprises:
localizing the first mobile device in the production facility based on the first video feed and the secondary video feed to calculate a first series of locations of the first mobile device in the production facility during the first video feed; and
identifying the first set of restricted regions depicted in the first video feed based on:
the first series of locations of the first mobile device;
the first set of observer credentials; and
a field of view of the first mobile device.

6. The method of claim 5, further comprising:
identifying the first set of restricted regions depicted in the secondary video feed based on the first set of observer credentials;
obscuring the first set of restricted regions in the secondary video feed to generate a modified secondary video feed; and
transmitting the secondary video feed to the first observer.

7. The method of claim 1, wherein obscuring the first set of restricted regions in the first video feed to generate a first modified video feed comprises, cropping the first video feed to remove the first set of restricted regions depicted in the video feed.

8. The method of claim 1:
further comprising, during an intermediate time period following the first time period and preceding the second time period:
at the hub device, receiving a second set of user credentials associated with a second operator, the hub device connected to a second mobile device; and
in response to separation of the second mobile device form the hub device, associating the second mobile device with the second operator;
further comprising, during the second time period:
accessing the first video feed depicting the first operator form the first mobile device;
accessing the second video feed depicting the second operator from the second mobile device;
synchronizing the first video feed and the second video feed; and
transmitting a split-screen video feed to the first observer based on:
the first set of observer credentials;
a first device identifier associated with the first device; and
a second device identifier associated with the second mobile device.

9. The method of claim 1:
wherein accessing the first set of observer credentials comprises accessing a first operator schedule defining:
a first scheduled manufacturing operation;
a second scheduled manufacturing operation;
the first observer of the first scheduled manufacturing operation, the first observer characterized by the first set of observer credentials; and
a second observer of the second scheduled manufacturing operation, the second observer characterized by a second set of observer credentials;
wherein accessing the first video feed from the mobile device comprises:
identifying a first segment of the first video feed depicting the first scheduled manufacturing operation; and
identifying a second segment of the first video feed depicting the second scheduled manufacturing operation;
wherein identifying the first set of restricted regions depicted in the first video feed based on the first set of observer credentials comprises, identifying the first set of restricted regions depicted in the first segment of the first video feed based on the first set of observer credentials; and
wherein obscuring the first set of restricted regions in the first video feed to generate a first modified video feed comprises, obscuring the first set of restricted regions in the first segment of the first video feed to generate a first modified segment in the first modified video feed.

10. The method of claim 9:
further comprising:
identifying a second set of restricted regions depicted in the second segment of the first video feed based on the second set of observer credentials; and
obscuring the second set of restricted regions in the second segment of the first video feed to generate a second modified segment in the first modified video feed; and
wherein serving the first modified video feed to the first observer portal associated with the first observer comprises, serving the first modified video feed containing the first modified segment and the second modified segment to the first observer portal.

11. The method of claim 1:
wherein accessing the first set of observer credentials comprises accessing a first operator schedule defining:
a first scheduled manufacturing operation; and
the first observer of the first scheduled manufacturing operation, the first observer characterized by the first set of observer credentials comprising a first set of viewable regions of the production facility; and
wherein identifying the first set of restricted regions in the first video feed based on the first set of observer credential comprises, identifying the first set of restricted regions outside of the first set of viewable regions depicted in the first video feed.

12. The method of claim 1:
wherein accessing the first video feed from the first mobile device comprises:
in response to direct connection of the first mobile device to the hub device, uploading the first video feed from the first mobile device to the hub device;
identifying a first scheduled manufacturing operation in the first video feed associated with the first observer; and
transmitting the first video feed from the hub device to the first observer based on the first set of observer credentials and the first scheduled manufacturing operation.

13. A method for remotely observing a manufacturing operation in a production facility comprising:
during a first time period:
at a hub device, receiving a first set of user credentials associated with a first operator, the hub device connected to a first mobile device; and
in response to separation of the first mobile device from the hub device, associating the first mobile device with the first operator; and
during a second time period following the first time period:
accessing a first video feed from the first mobile device;
accessing a first operator schedule defining:

a first scheduled manufacturing operation; and a first observer of the first scheduled manufacturing operation, the first observer characterized by a first set of observer credentials;

in response to identifying the first scheduled manufacturing operation in the first video feed, routing the first video feed to the first observer based on the first set of observer credentials.

14. The method of claim 13, wherein routing the first video feed to the first observer comprises:

identifying a first set of restricted regions depicted in the first video feed based on the first set of observer credentials;

obscuring the first set of restricted regions in the first video feed to generate a first modified video feed; and serving the first modified video feed to a first observer portal associated with the first observer.

15. The method of claim 13:

further comprising receiving a secondary video feed from a second device, the secondary video feed concurrent with the first video feed and depicting the first operator and the first mobile device; and wherein routing the first video feed to the first observer comprises:

localizing the first mobile device in the production facility based on the first video feed and the secondary video feed to calculate a first series of locations of the first mobile device in the production facility during the first video feed; and identifying a first set of restricted regions depicted in the first video feed based on:
the first series of locations of the first mobile device;
the first set of observer credentials; and
a field of view of the first mobile device obscuring the first set of restricted regions in the first video feed to generate a first modified video feed; and serving the first modified video feed to a first observer portal associated with the first observer.

16. The method of claim 13, wherein accessing the video feed from the first mobile device comprises:

in response to direct connection of the first mobile device to the hub device, uploading the first video feed from the first mobile device to the hub device; and transmitting the first video feed from the hub device to the first observer based on the first set of observer credentials.

17. A method for a hub device within a production facility, comprising:

at a hub device, receiving a first set of user credentials associated with a first operator, the hub device connected to a first mobile device; and in response to separation of the first mobile device from the hub device, associating a first device identifier of the first mobile device with the first operator; and accessing a first set of observer credentials associated with a first observer;

accessing a first video feed from the first mobile device;

identifying a first set of restricted regions depicted in the first video feed based on the first set of observer credentials and the first device identifier;

obscuring the first set of restricted regions in the first video feed to generate a first modified video feed; and serving the first modified video feed to a first observer portal associated with the first observer.

18. The method of claim 17:

further comprising receiving a secondary video feed from a second device, the secondary video feed concurrent with the first video feed and depicting the first operator and the first mobile device; and wherein identifying the first set of restricted regions depicted in the first video feed comprises:

localizing the first mobile device in the production facility based on the first video feed and the secondary video feed to calculate a first series of locations of the first mobile device in the production facility during the first video feed; and identifying the first set of restricted regions depicted in the first video feed based on:
the first series of locations of the first mobile device;
the first device identifier of the first mobile device;
the first set of observer credentials; and
a field of view of the first mobile device.

19. The method of claim 17:

wherein accessing the first set of observer credentials comprises accessing a first operator schedule defining:
a first scheduled manufacturing operation; and
the first observer of the first scheduled manufacturing operation, the first observer characterized by the first set of observer credentials; and wherein accessing the first video feed from the first mobile device comprises:

identifying the first scheduled manufacturing operation in the first video feed associated with the first observer; and transmitting the first video feed from the hub device to the first observer based on the first set of observer credentials and the first scheduled manufacturing operation.

20. The method of claim 17, wherein obscuring the first set of restricted regions in the first video feed to generate a first modified video feed comprises, cropping the first video feed to remove the first set of restricted regions depicted in the video feed.

* * * * *